(12) United States Patent
Chiang

(10) Patent No.: US 8,508,945 B1
(45) Date of Patent: Aug. 13, 2013

(54) CARD INSTALLATION DEVICE

(75) Inventor: Chang-An Chiang, New Taipei (TW)

(73) Assignee: HannStar Display Corp., New Taipei (TW)

(*) Notice: Subject to any disclaimer, the term of this patent is extended or adjusted under 35 U.S.C. 154(b) by 0 days.

(21) Appl. No.: 13/457,495

(22) Filed: Apr. 27, 2012

(30) Foreign Application Priority Data

Feb. 27, 2012 (CN) .......................... 2012 1 0046393

(51) Int. Cl.
*H05K 5/00* (2006.01)
(52) U.S. Cl.
USPC ............ 361/732; 361/801; 361/807; 343/892
(58) Field of Classification Search
USPC ............... 29/729, 739, 825, 832, 874–884; 439/341, 366, 500, 754, 929; 361/732, 801–807
See application file for complete search history.

(56) References Cited

U.S. PATENT DOCUMENTS

| | | | | |
|---|---|---|---|---|
| 4,256,356 | A | * | 3/1981 | Roth .......................... 312/332.1 |
| 4,445,740 | A | * | 5/1984 | Wallace ........................ 439/152 |
| 4,887,188 | A | * | 12/1989 | Yoshida et al. .......... 361/679.31 |
| 6,210,193 | B1 | * | 4/2001 | Ito et al. ........................ 439/326 |
| 6,821,136 | B2 | * | 11/2004 | Lai ................................. 439/159 |
| 7,384,194 | B2 | * | 6/2008 | Gatten ......................... 378/208 |
| 7,658,649 | B2 | * | 2/2010 | Satoh et al. ................... 439/630 |
| 8,113,886 | B2 | * | 2/2012 | Jung et al. .................... 439/630 |

* cited by examiner

*Primary Examiner* — Minh Trinh
(74) *Attorney, Agent, or Firm* — Winston Hsu; Scott Margo

(57) ABSTRACT

A card installation device includes a casing and a pushing member. The casing has an accommodating recess for accommodating a card. A pushing end of the pushing member is movably disposed in the casing. When the card is accommodated in the accommodating recess, the pushing end is used for pushing the card into a card slot of an electronic device. Accordingly, the invention can assist a user in aligning the card with the card slot well during insertion so as to prevent the card and/or the card slot from being damaged.

14 Claims, 16 Drawing Sheets

CARD INSTALLATION DEVICE

BACKGROUND OF THE INVENTION

1. Field of the Invention

The invention relates to a card installation device and, more particularly, to a card installation device capable of assisting a user in installing a small card into a card slot of an electronic device.

2. Description of the Prior Art

So far there are various card slots disposed on a periphery of a casing of an electronic device for different types of cards correspondingly, such as Subscriber Identity Module card (SIM card), Micro Secure Digital card (Micro SD card), Mini Secure Digital card (Mini SD card), Multi Media Card (MMC), and so on. Referring to FIG. 1, FIG. 1 is a schematic diagram illustrating an electronic device 1 and two cards 2a, 2b with different sizes of the prior art. As shown in FIG. 1, there are two card slots 10a, 10b disposed on one side of a casing of the electronic device 1 for the cards 2a, 2b with different sizes. For example, the card 2a may be a SIM card and the card 2b may be a Micro SD card. Since the sizes of the cards 2a, 2b are small, it is inconvenient for a user to insert the cards 2a, 2b into corresponding card slots 10a, 10b by hand. If the user does not align the cards 2a, 2b with the card slots 10a, 10b during insertion or inserts the cards 2a, 2b into the card slots 10a, 10b with large force, the cards 2a, 2b and/or the card slots 10a, 10b may be damaged.

SUMMARY OF THE INVENTION

An objective of the invention is to provide a card installation device capable of assisting a user in installing a small card into a card slot of an electronic device, so as to solve the aforesaid problems.

According to an embodiment of the invention, a card installation device comprises a casing and a pushing member. The casing has a first accommodating recess for accommodating a first card. A pushing end of the pushing member is movably disposed in the casing. When the first card is accommodated in the first accommodating recess, the pushing end is used for pushing the first card.

In this embodiment, the card installation device may further comprise a resilient plate fastened on the casing and located over the first accommodating recess, wherein when the first card is accommodated in the first accommodating recess, the resilient plate is used for clamping the first card.

In this embodiment, a front end of the resilient plate may be arc-shaped.

In this embodiment, the casing may have a protruding portion therein, the pushing member may have a guiding groove, and the protruding portion is disposed in the guiding groove.

In this embodiment, the casing may have two side walls therein located at opposite sides of the protruding portion, the pushing member may have two side wings located at opposite sides of the guiding groove and opposite to the two side walls, the card installation device may further comprise two resilient members, and each of the two resilient members is disposed between one of the side walls and one of the side wings correspondingly.

In this embodiment, the card installation device may further comprise a resilient member disposed in the guiding groove, wherein one end of the resilient member abuts against the protruding portion, and another end of the resilient member abuts against a side wall of the guiding groove.

In this embodiment, the casing may have a holding portion, the pushing member may have a pressing portion, and the holding portion and the pressing portion are used together for a user to operate the card installation device.

In this embodiment, the card installation device may further comprise a clamping member pivotally connected to the casing and used for clamping the first card with the casing.

In this embodiment, a front end of the casing may have a pushing structure, wherein when the first card is installed in a card slot of an electronic device, the pushing structure is used for pushing the first card such that the first card ejects out of the card slot of the electronic device.

In this embodiment, the casing may further have a second accommodating recess for accommodating a second card, the first accommodating recess and the second accommodating recess are arranged up and down, a width of the second accommodating recess is different from a width of the first accommodating recess, the pushing end may have a first pushing surface and a second pushing surface, the first pushing surface is used for pushing the first card when the first card is accommodated in the first accommodating recess, and the second pushing surface is used for pushing the second card when the second card is accommodated in the second accommodating recess.

In this embodiment, a first fool-proof opening and a second fool-proof opening may be formed on opposite sides of the casing, a shape of the first fool-proof opening is corresponding to a shape of the first card and the first fool-proof opening communicates with the first accommodating recess such that the first card is allowed to pass through the first fool-proof opening and then gets into the first accommodating recess, a shape of the second fool-proof opening is corresponding to a shape of the second card and the second fool-proof opening communicates with the second accommodating recess such that the second card is allowed to pass through the second fool-proof opening and then gets into the second accommodating recess.

In this embodiment, the card installation device may further comprise a clamping member pivotally connected to the casing, wherein the clamping member and the second fool-proof opening are located at same side of the casing, the clamping member is used for clamping the first card or the second card with the casing, and a through hole is formed on the clamping member such that the second card is allowed to pass through the through hole and the second fool-proof opening and then gets into the second accommodating recess.

In this embodiment, a first pattern, which is corresponding to the shape of the first card, may be formed in the first fool-proof opening and a second pattern, which is corresponding to the shape of the second card, may be formed in the second fool-proof opening.

As mentioned in the above, a user can install a card in the accommodating recess of the casing of the card installation device, align the card with a card slot of an electronic device using the card installation device, and then press the pushing member to push the card into the card slot of the electronic device by the pushing end of the pushing member. Therefore, the invention can assist the user in aligning the card with the card slot well during insertion so as to prevent the card and/or the card slot from being damaged. Furthermore, the invention may form a plurality of accommodating recesses with different widths in the casing of the card installation device for accommodating various cards with different sizes such that the user can operates the card installation device of the invention to install various cards with different sizes into corresponding card slots of the electronic device. Moreover, the invention may form a fool-proof opening, which is corresponding to a shape of the card, on the casing of the card installation device, so as to prevent the card from being installed in a wrong direction or in a wrong recess by the user.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
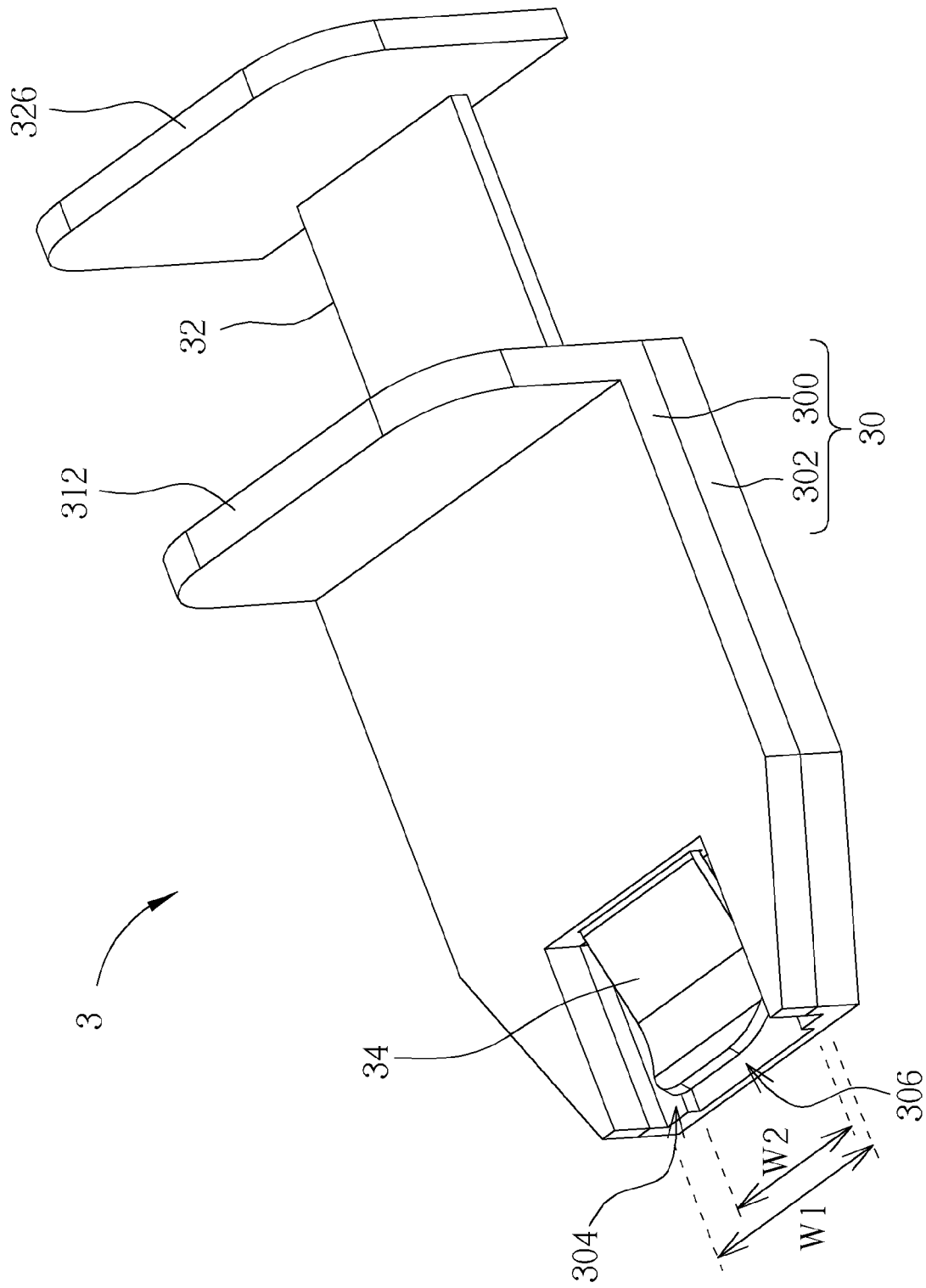
FIG. 2 is a perspective view illustrating a card installation device according to an embodiment of the invention.
Figure 3:
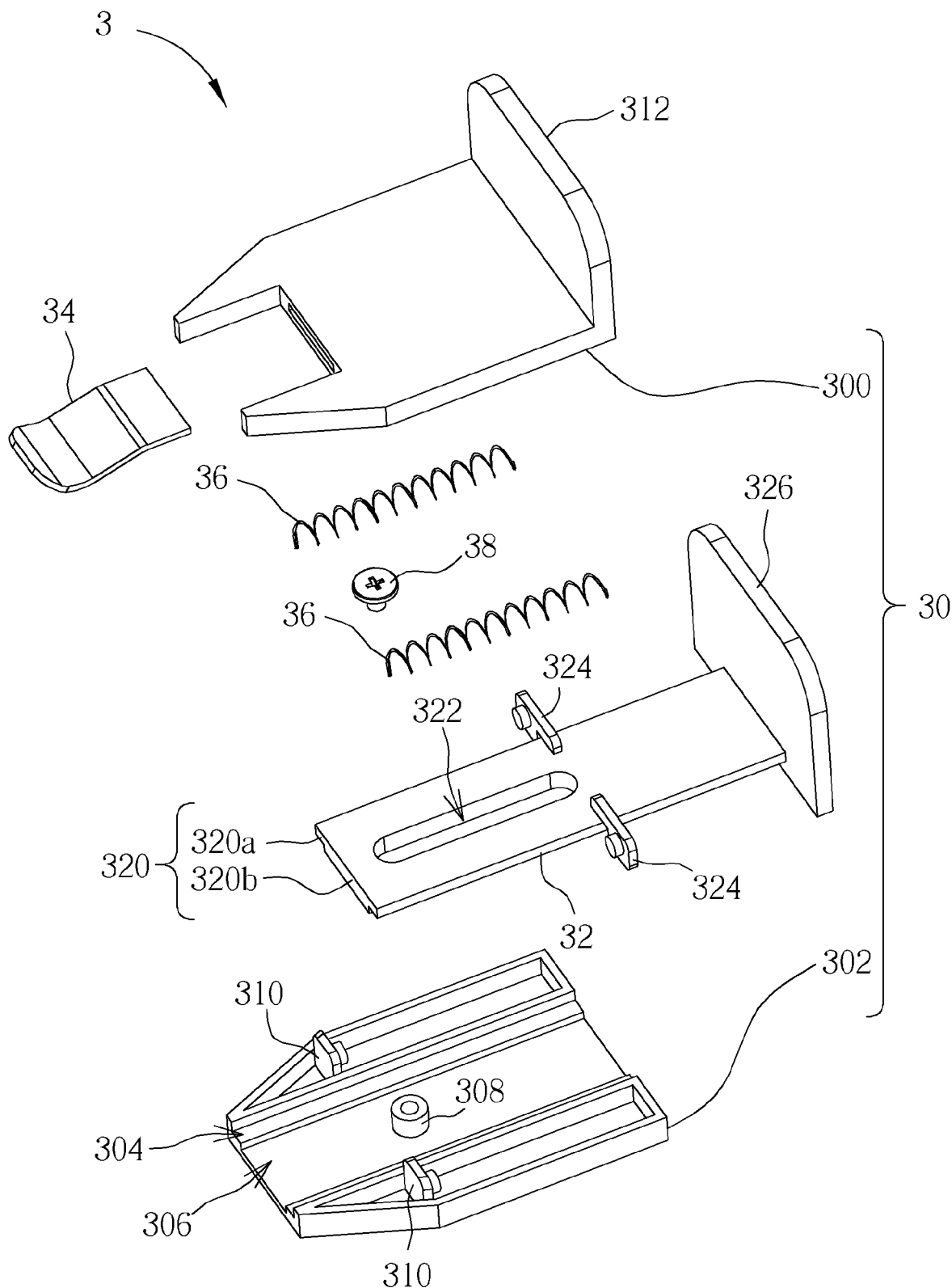
FIG. 3 is an exploded view illustrating the card installation device shown in FIG. 2.
Figure 4:
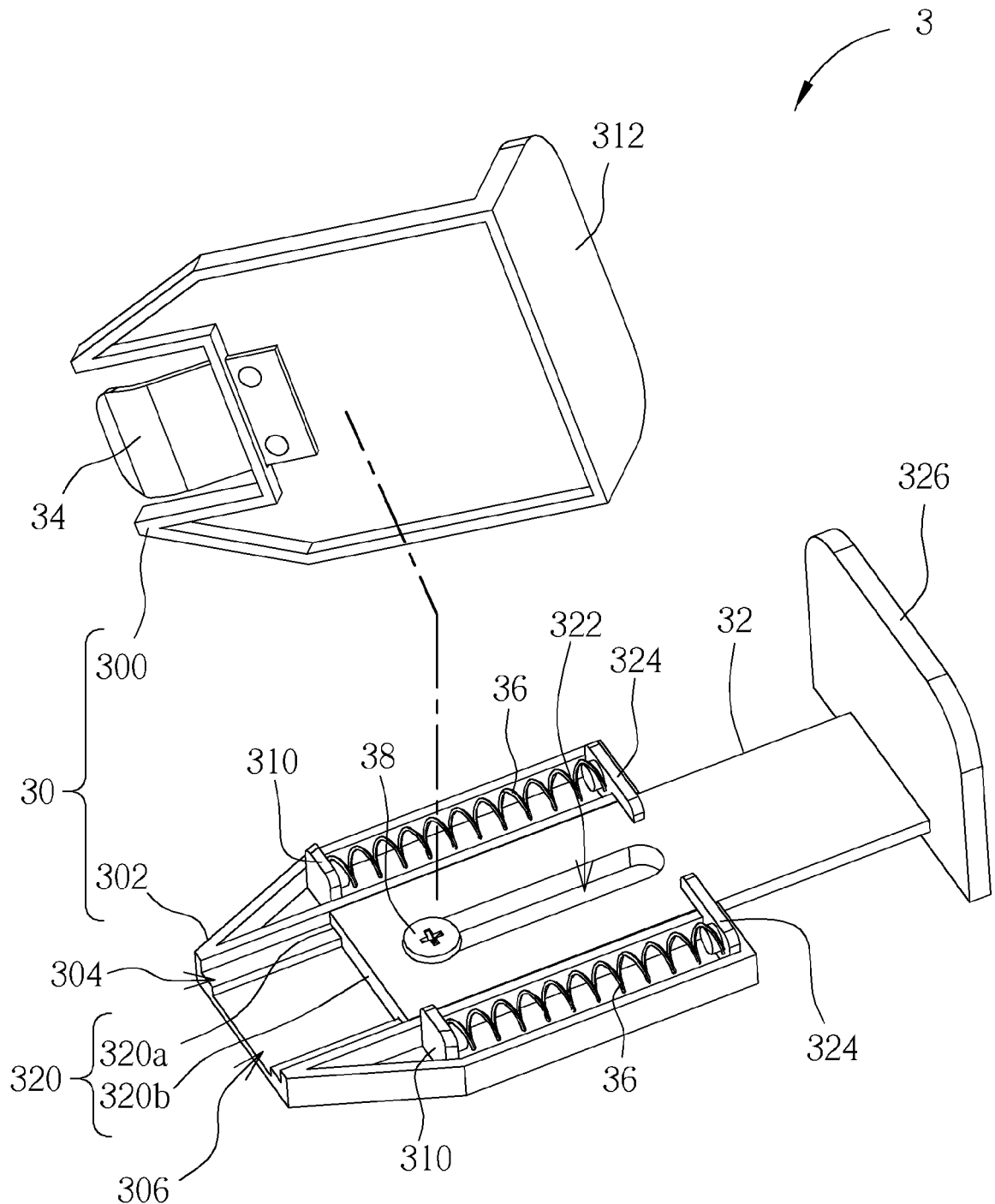
FIG. 4 is a partial assembly view illustrating the card installation device shown in FIG. 3.
Figure 5:
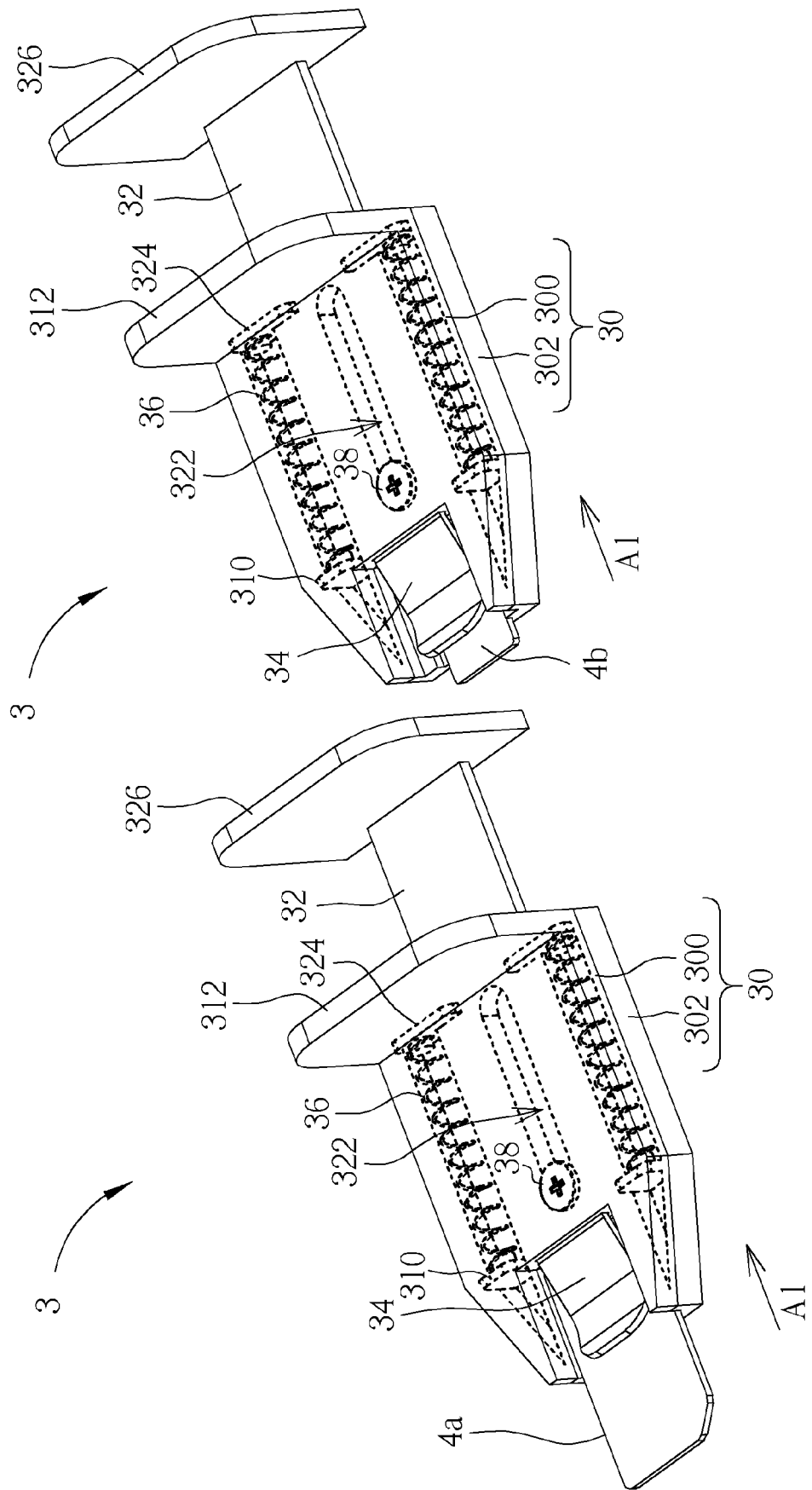
FIG. 5 is a schematic diagram illustrating a first card and a second card installed in the casing of the card installation device shown in FIG. 2.
Figure 6:
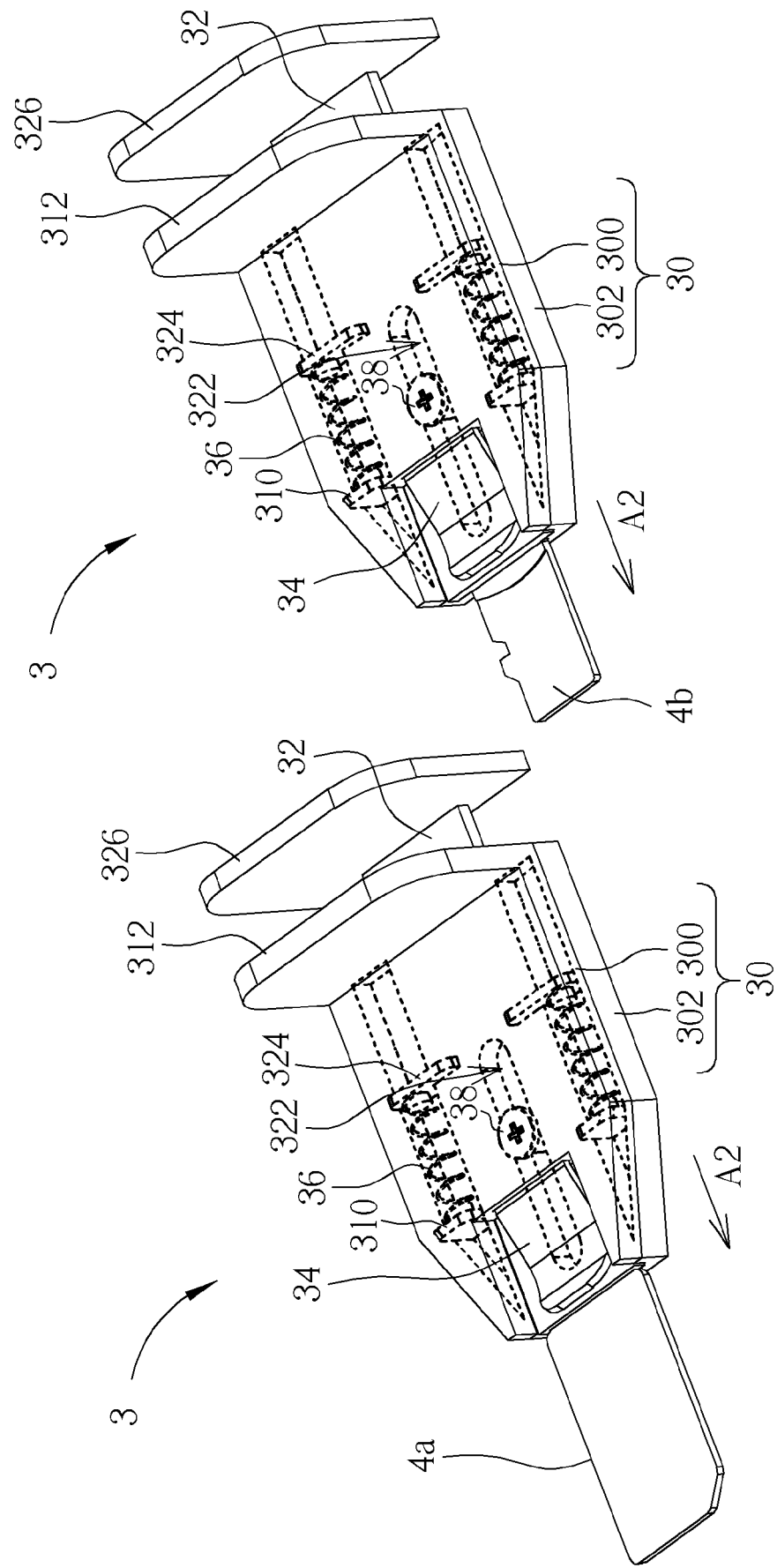
FIG. 6 is a schematic diagram illustrating the first card and the second card pushed out of the casing by the pushing member shown in FIG. 5.

Referring to FIGS. 2 to 6, FIG. 2 is a perspective view illustrating a card installation device 3 according to an embodiment of the invention, FIG. 3 is an exploded view illustrating the card installation device 3 shown in FIG. 2, FIG. 4 is a partial assembly view illustrating the card installation device 3 shown in FIG. 3, FIG. 5 is a schematic diagram illustrating a first card 4a and a second card 4b installed in the casing 30 of the card installation device 3 shown in FIG. 2, and FIG. 6 is a schematic diagram illustrating the first card 4a and the second card 4b pushed out of the casing 30 by the pushing member 32 shown in FIG. 5.

As shown in FIGS. 2 to 4, the card installation device 3 comprises a casing 30, a pushing member 32, a resilient plate 34, two resilient members 36 and a fixing member 38. In this embodiment, the casing 30 comprises an upper casing 300 and a lower casing 302, wherein the upper casing 300 and the lower casing 302 are detachably combined together. The casing 30 has a first accommodating recess 304 and a second accommodating recess 306, wherein a width W2 of the second accommodating recess 306 is different from a width W1 of the first accommodating recess 304 and the first accommodating recess 304 and the second accommodating recess 306 are arranged up and down. In this embodiment, the first accommodating recess 304 is used for accommodating the first card 4a and the second accommodating recess 306 is used for accommodating the second card 4b. In practical applications, the first card 4a may be, but not limited to, a SIM card and the second card 4b may be, but not limited to, a Micro SD card. The first card 4a and the second card 4b also may be other memory cards. Since a size of the first card 4a is larger than a size of the second card 4b, the width W1 of the first accommodating recess 304 is also larger than the width W2 of the second accommodating recess 306. It should be noted that the casing 30 may have only the first accommodating recess 304 or only the second accommodating recess 306, or the casing 30 may have more than two accommodating recesses for more than two cards with different sizes. In other words, the number of accommodating recesses of the casing 30 may be determined based on the types of the cards and is not limited to the embodiment shown in FIGs. 2 to 6.

A pushing end 320 of the pushing member 32 is movably disposed in the casing 30. When the first card 4a is accommodated in the first accommodating recess 304 or the second card 4b is accommodated in the second accommodating recess 306, the pushing end 320 is used for pushing the first card 4a or the second card 4b. In this embodiment, the pushing end 320 has a first pushing surface 320a and a second pushing surface 320b corresponding to the first card 4a and the second card 4b with different sizes, respectively. The first pushing surface 320a is used for pushing the first card 4a when the first card 4a is accommodated in the first accommodating recess 304, and the second pushing surface 320b is used for pushing the second card 4b when the second card 4b is accommodated in the second accommodating recess 306.

As shown in FIGS. 2 and 4, one end of the resilient plate 34 is fastened on the upper casing 300 of the casing 30 and located over the first accommodating recess 304 and the second accommodating recess 306. In this embodiment, the resilient plate 34 can be pushed to deflect upwardly and then generates downward pressure. As shown in FIG. 5, a user can install the first card 4a and the second card 4b into the first accommodating recess 304 and the second accommodating recess 306 in a direction indicated by an arrow A1, respectively. A front end of the resilient plate 34 is arc-shaped so that the first card 4a and the second card 4b can push the resilient plate 34 upwardly during insertion. The resilient plate 34 is used for clamping the first card 4a when the first card 4a is accommodated in the first accommodating recess 304 and the resilient plate 34 is used for clamping the second card 4b when the second card 4b is accommodated in the second accommodating recess 306. As shown in FIGS. 3 and 4, the casing 30 has a protruding portion 308 and the pushing member 32 has a guiding groove 322. The protruding portion 308 is disposed in the guiding groove 322 and the fixing member 38 is fixed on the protruding portion 308 such that the pushing member 32 can move forward and backward with respect to the protruding portion 308 within the guiding groove 322. In practical applications, the fixing member 38 may be a screw, rivet or other engaging members.

The casing 30 may have two side walls 310 therein located at opposite sides of the protruding portion 308 and the pushing member 32 may have two side wings 324 located at opposite sides of the guiding groove 322 and opposite to the two side walls 310. Each of the resilient members 36 is disposed between one of the side walls 310 and one of the side wings 324 correspondingly. In other words, both ends of the resilient member 36 abut against the side wall 310 and the side wing 324, respectively. In practical applications, the resilient member 36 may be a spring or other resilient components. When the pushing member 32 is pressed to move with respect to the casing 30, the side wing 324 will compress the resilient member 36 while the pushing member 32 is moving. When the pushing member 32 is released, the compressed resilient member 36 will generate an elastic force for pushing back the pushing member 32 to the original position before being pressed.

The upper casing 300 of the casing 30 may have a holding portion 312 and the pushing member 32 may have a pressing portion 326 outside the casing 30. In this embodiment, the holding portion 312 and the pressing portion 326 both are, but not limited to, plate-shaped. The holding portion 312 and the pressing portion 326 can be used together for a user to operate the card installation device 3.

Figure 1:
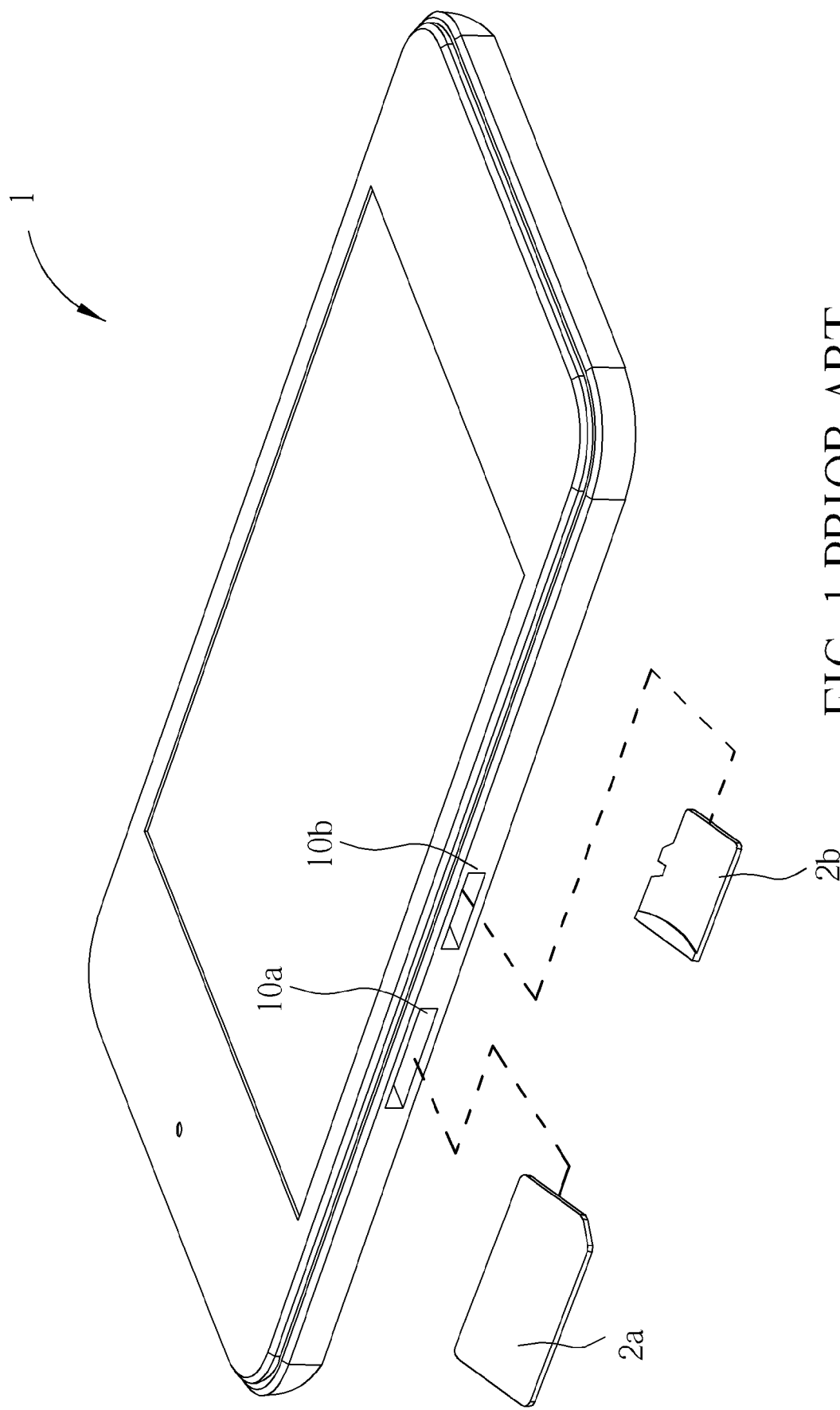
FIG. 1 is a schematic diagram illustrating an electronic device and two cards with different sizes of the prior art.

When the user wants to operate the card installation device 3 to install the first card 4a or the second card 4b into a card slot of an electronic device (see the card slots 10a, 10b shown in FIG. 1), he or she has to insert the first card 4a or the second card 4b into the first accommodating recess 304 or the second accommodating recess 306 of the casing 30 of the card installation device 3 in the direction indicated by the arrow A1, as shown in FIG. 5. Afterward, the user can hold the holding portion 312 and the pressing portion 326 and operate the card installation device 3 to align the first card 4a or the second card 4b with the corresponding card slot of the electronic device. Then, the user can press the pressing portion 326 of the pushing member 32 to drive the pushing end 320 of the pushing member 32 to push the first card 4a or the second card 4b toward a direction indicated by an arrow A2 (as shown in FIG. 6), so as to push the first card 4a or the second card 4b from the casing 30 into the corresponding card slot of the electronic device. As mentioned in the above, when the pressing portion 326 of the pushing member 32 is released, the compressed resilient member 36 will generate an elastic force for pushing back the pushing member 32 to the original position before being pressed.

Figure 7:
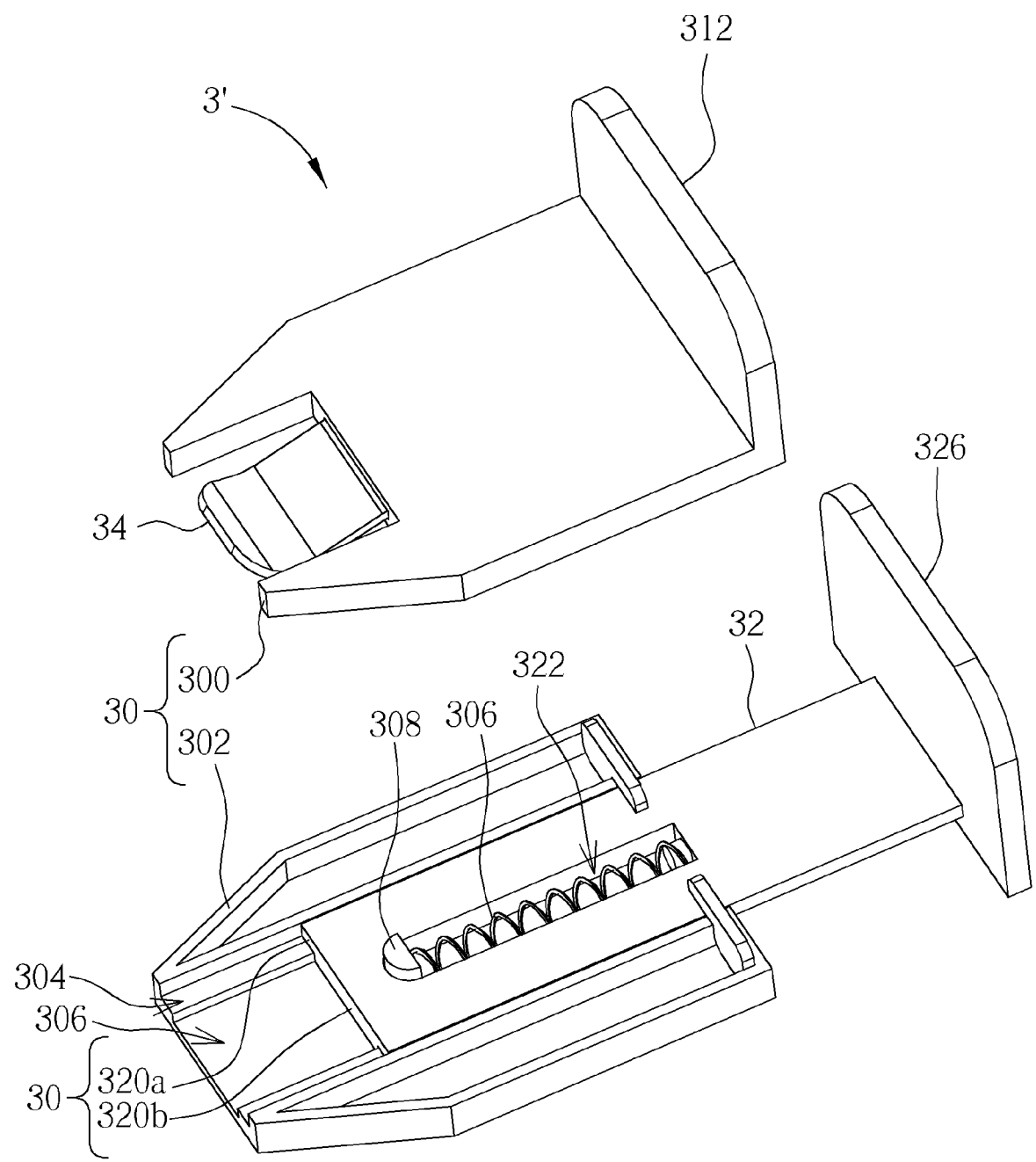
FIG. 7 is a partial exploded view illustrating a card installation device according to another embodiment of the invention.

Referring to FIG. 7, FIG. 7 is a partial exploded view illustrating a card installation device 3' according to another embodiment of the invention. The main difference between the card installation device 3' and the aforesaid card installation device 3 is that the card installation device 3' comprises only one resilient member 36 disposed in the guiding groove 322 of the pushing member 32. As shown in FIG. 7, one end of the resilient member 36 abuts against the protruding portion 308 and the other end of the resilient member 36 abuts against an inner wall of the guiding groove 322. When the pushing member 32 is pressed to move with respect to the casing 30, the inner wall of the guiding groove 322 will compress the resilient member 36. When the pushing member 32 is released, the compressed resilient member 36 will generate an elastic force for pushing back the pushing member 32 to the original position before being pressed.

Figure 8:
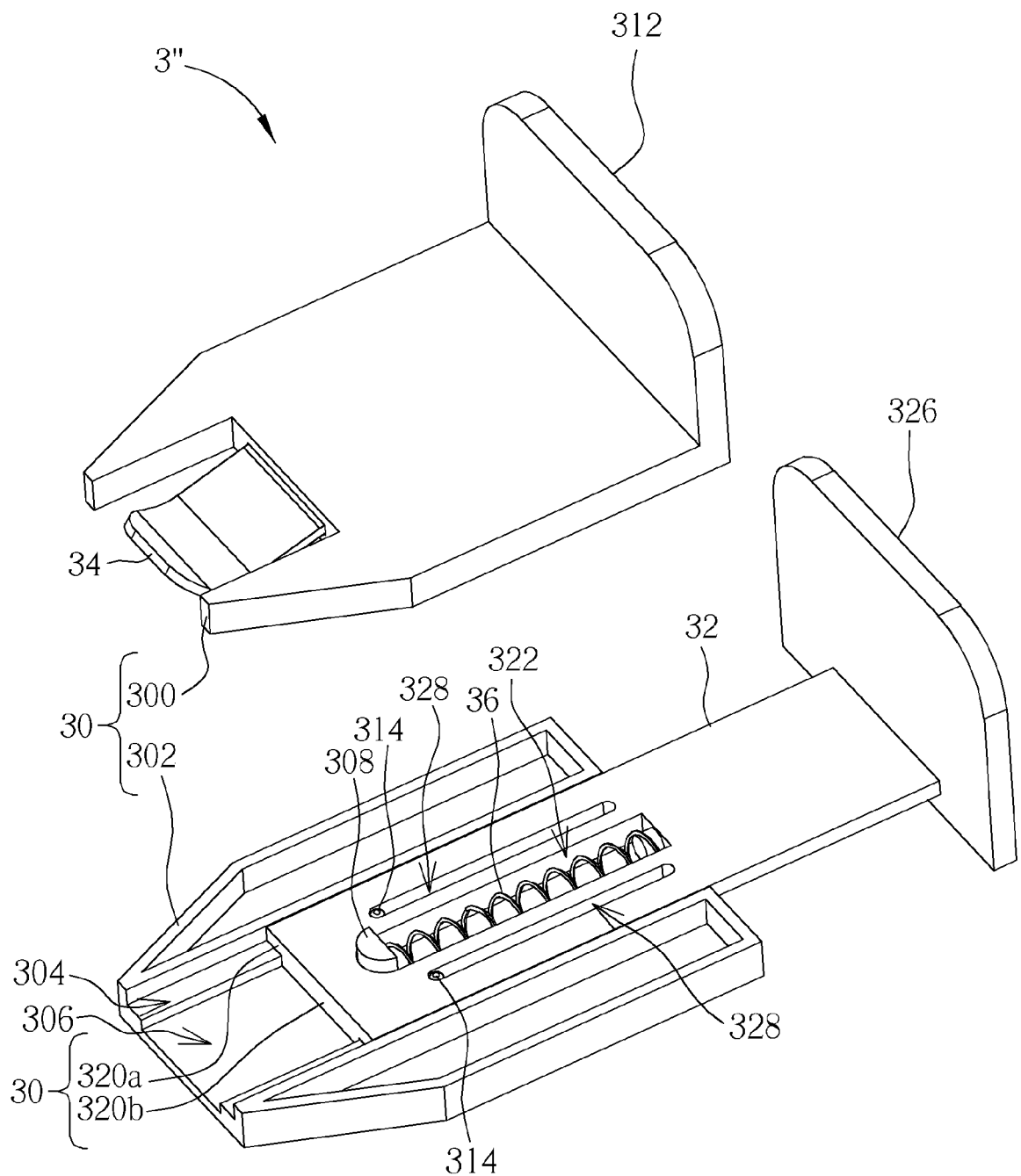
FIG. 8 is a partial exploded view illustrating a card installation device according to another embodiment of the invention.

Referring to FIG. 8, FIG. 8 is a partial exploded view illustrating a card installation device 3" according to another embodiment of the invention. The main difference between the card installation device 3" and the aforesaid card installation device 3' is that the card installation device 3" further has two protruding portions 314 located at opposite sides of the protruding portion 308 and two longitudinal grooves 328 located at opposite sides of the guiding groove 322. As shown in FIG. 8, the two protruding portions 314 are disposed in the two longitudinal grooves 328, respectively, such that the pushing member 32 is more stable during movement.

Figure 9:
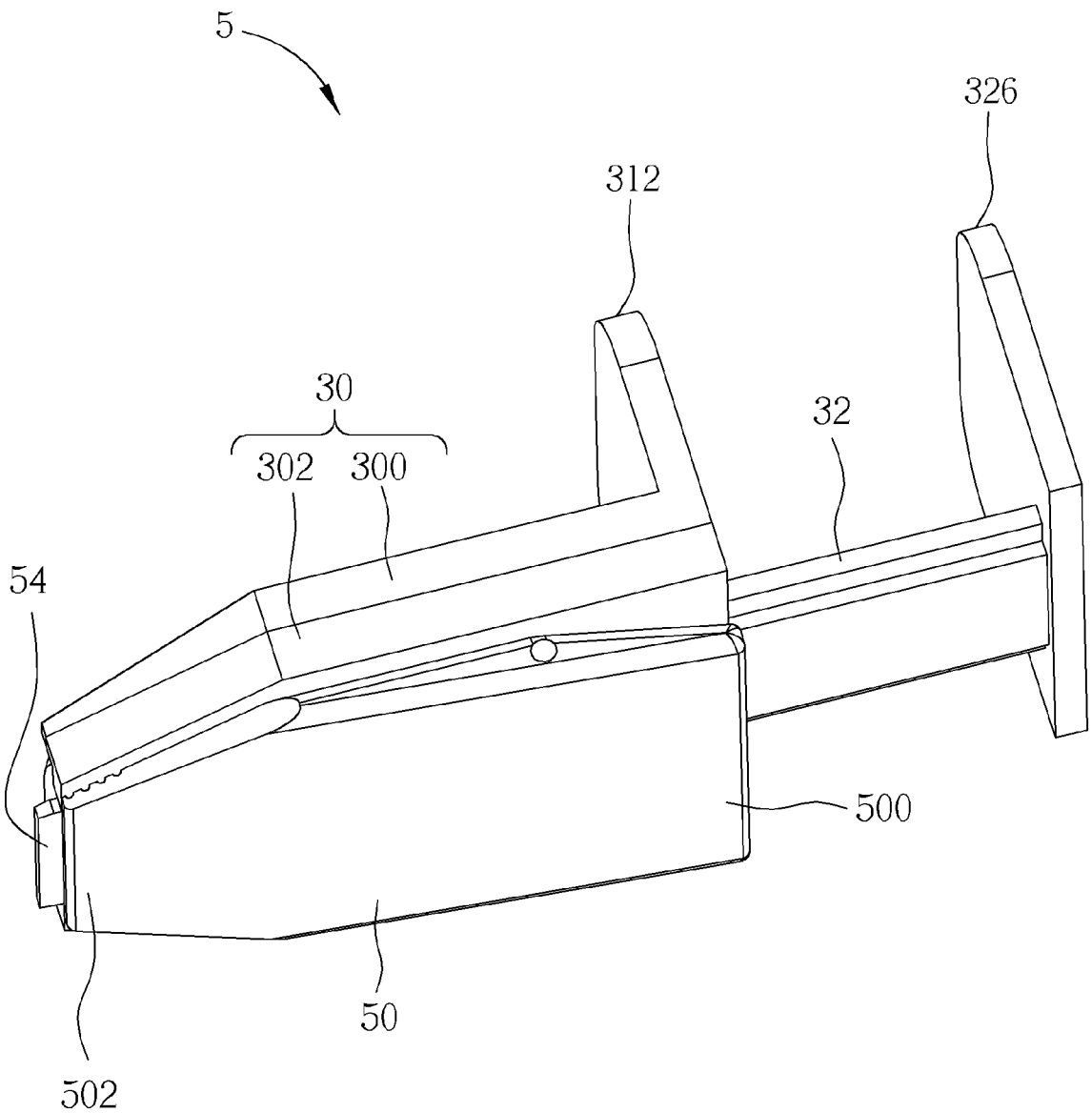
FIG. 9 is a perspective view illustrating a card installation device according to another embodiment of the invention.
Figure 10:
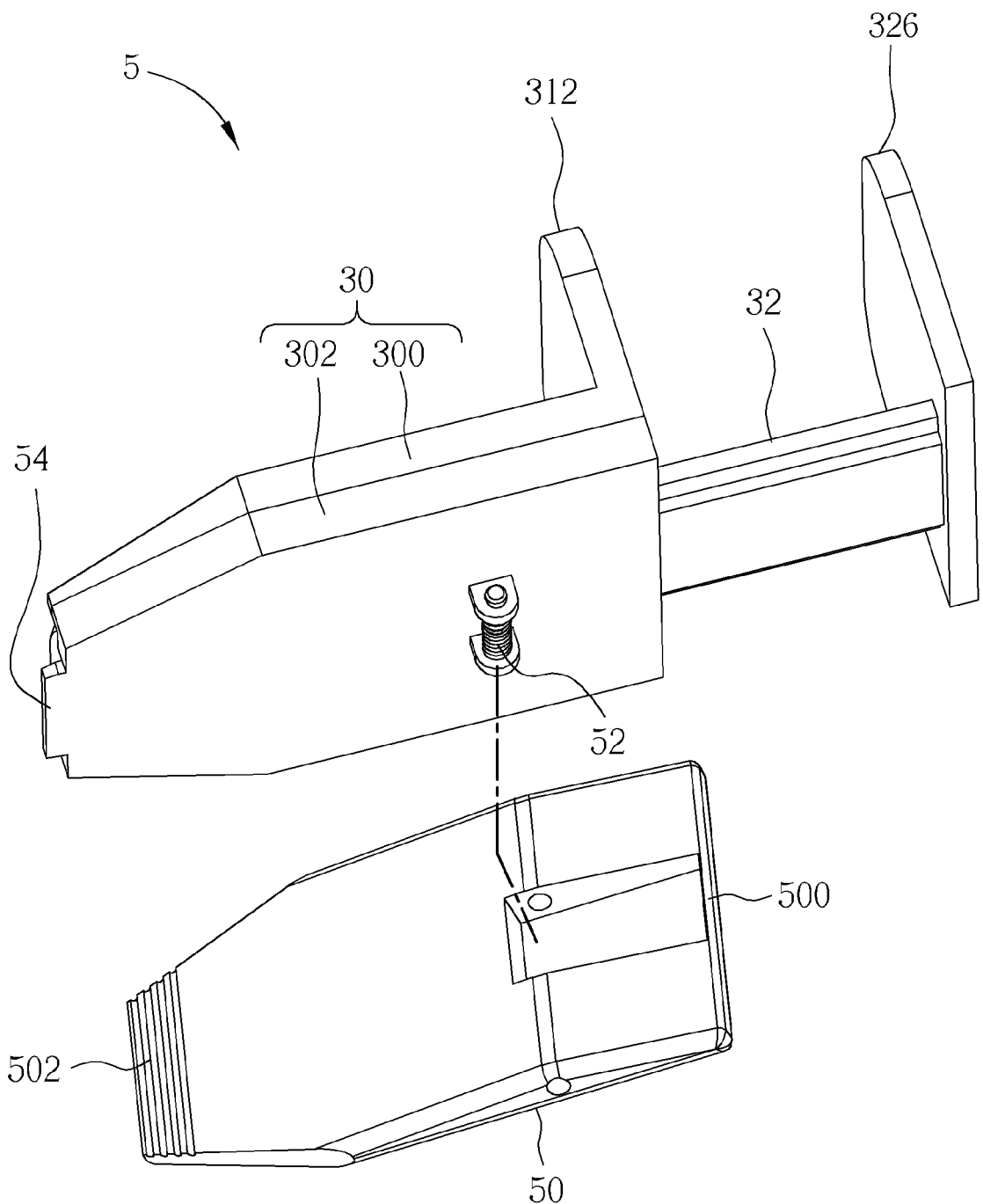
FIG. 10 is a partial exploded view illustrating the card installation device shown in FIG. 9.
Figure 11:
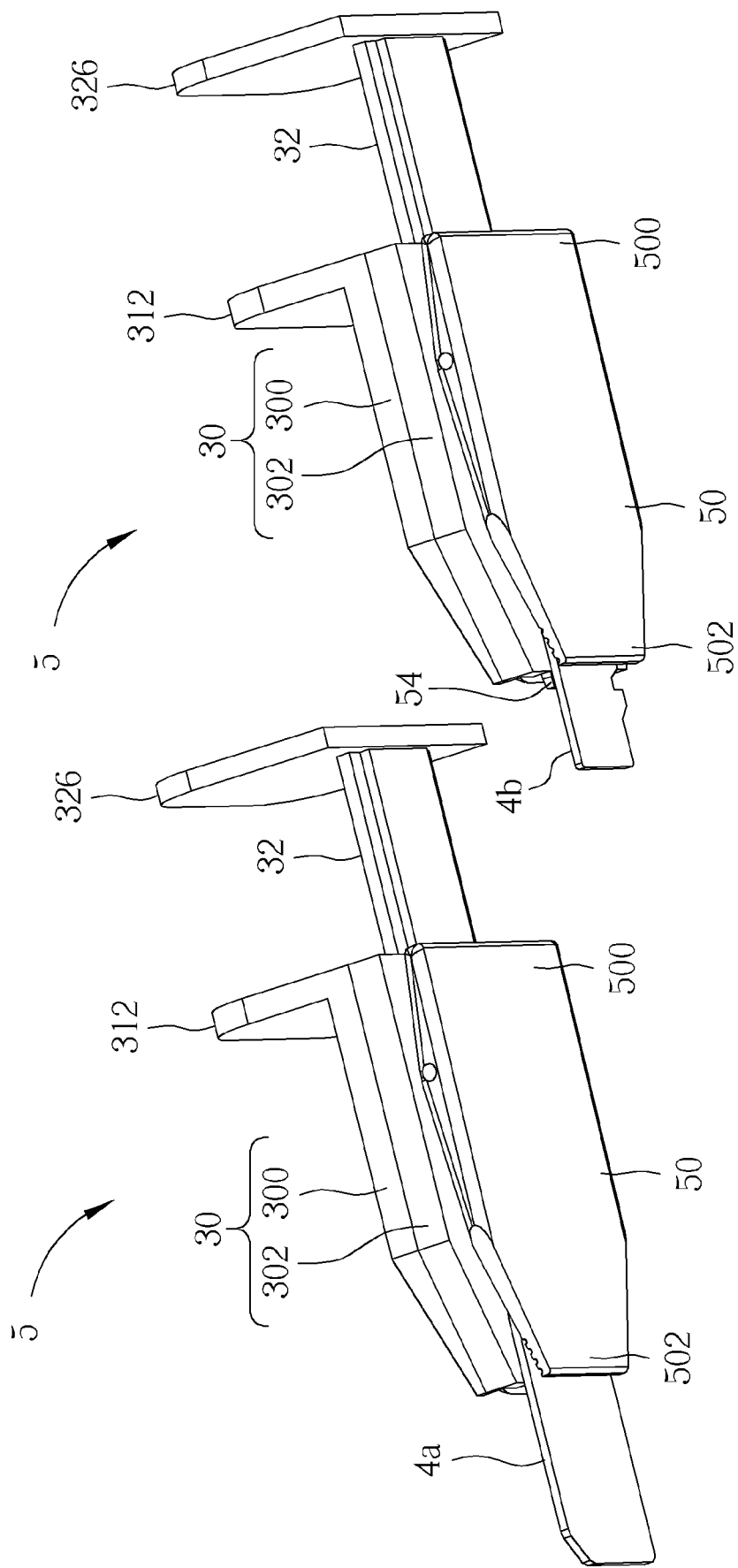
FIG. 11 is a schematic diagram illustrating the first card and the second card clamped by the clamping member of the card installation device shown in FIG. 9.

Referring to FIGs. 9 to 11, FIG. 9 is a perspective view illustrating a card installation device 5 according to another embodiment of the invention, FIG. 10 is a partial exploded view illustrating the card installation device 5 shown in FIG. 9, and FIG. 11 is a schematic diagram illustrating the first card 4a and the second card 4b clamped by the clamping member 50 of the card installation device 5 shown in FIG. 9. The main difference between the card installation device 5 and the aforesaid card installation device 3 is that the card installation device 5 further comprises a clamping member 50 pivotally connected to the lower casing 302 of the casing 30, as shown in FIG. 9. In this embodiment, a hinge 52 may be disposed at a joint between the clamping member 50 and the lower casing 302. Furthermore, a front end of the lower casing 302 of the casing 30 has a pushing structure 54. When the first card 4a or the second card 4b is installed in the corresponding card slot of the electronic device, the user can use the pushing structure 52 to push the first card 4a or the second card 4b such that the first card 4a or the second card 4b ejects out of the corresponding card slot of the electronic device. Afterward, the user can press a pressing portion 500 of the clamping member 50 to rotate the clamping portion 502 of the clamping member 52 away from a bottom of the lower casing 302. Consequently, the clamping portion 502 can be used for clamping the first card 4a or the second card 4b with the lower casing 302 of the casing 30, as shown in FIG. 11. Accordingly, the user can use the card installation device 5 to take the first card 4a or the second card 4b out of the corresponding card slot of the electronic device easily.

Figure 12:
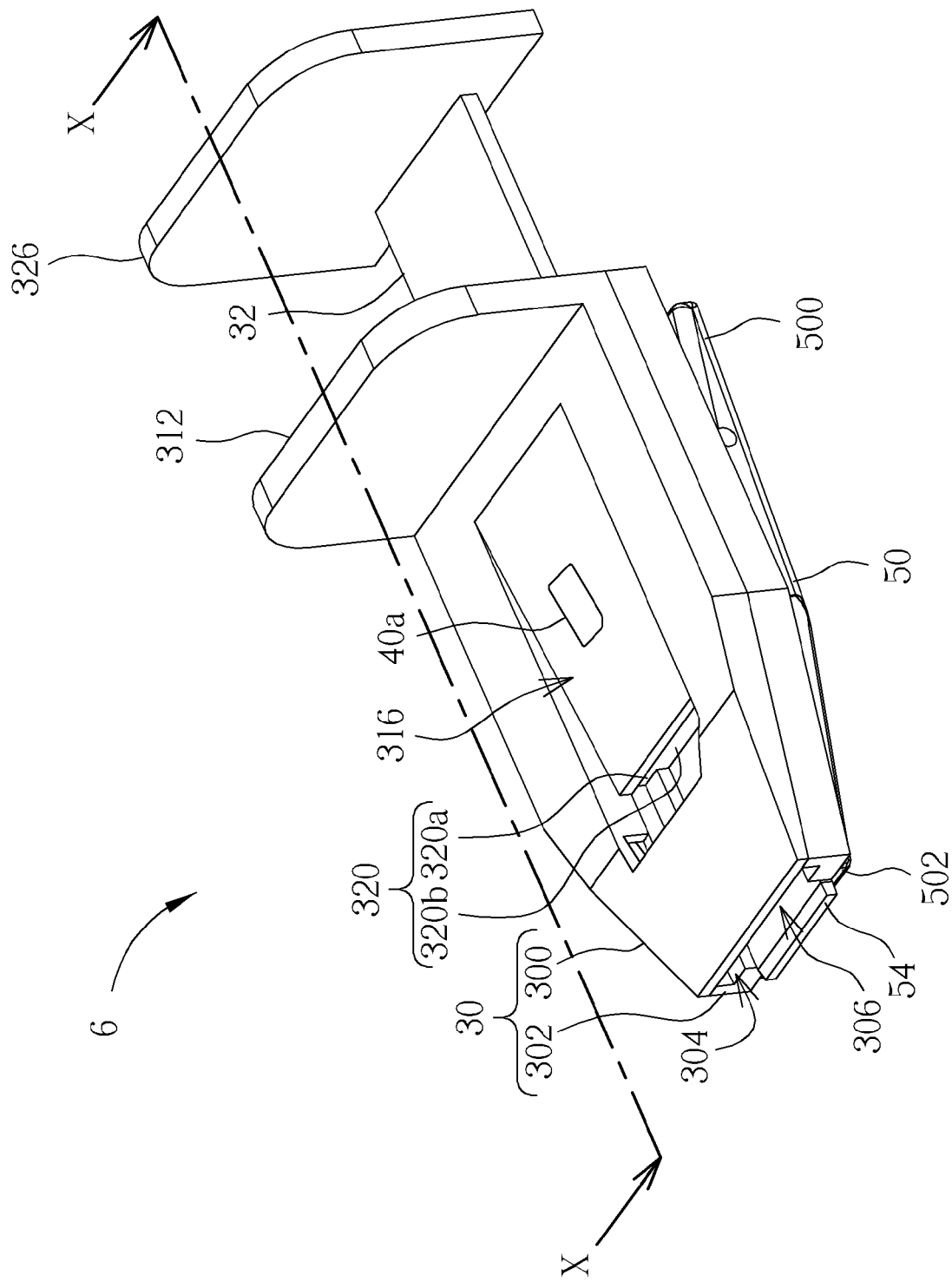
FIG. 12 is a perspective view illustrating a card installation device according to another embodiment of the invention.
Figure 13:
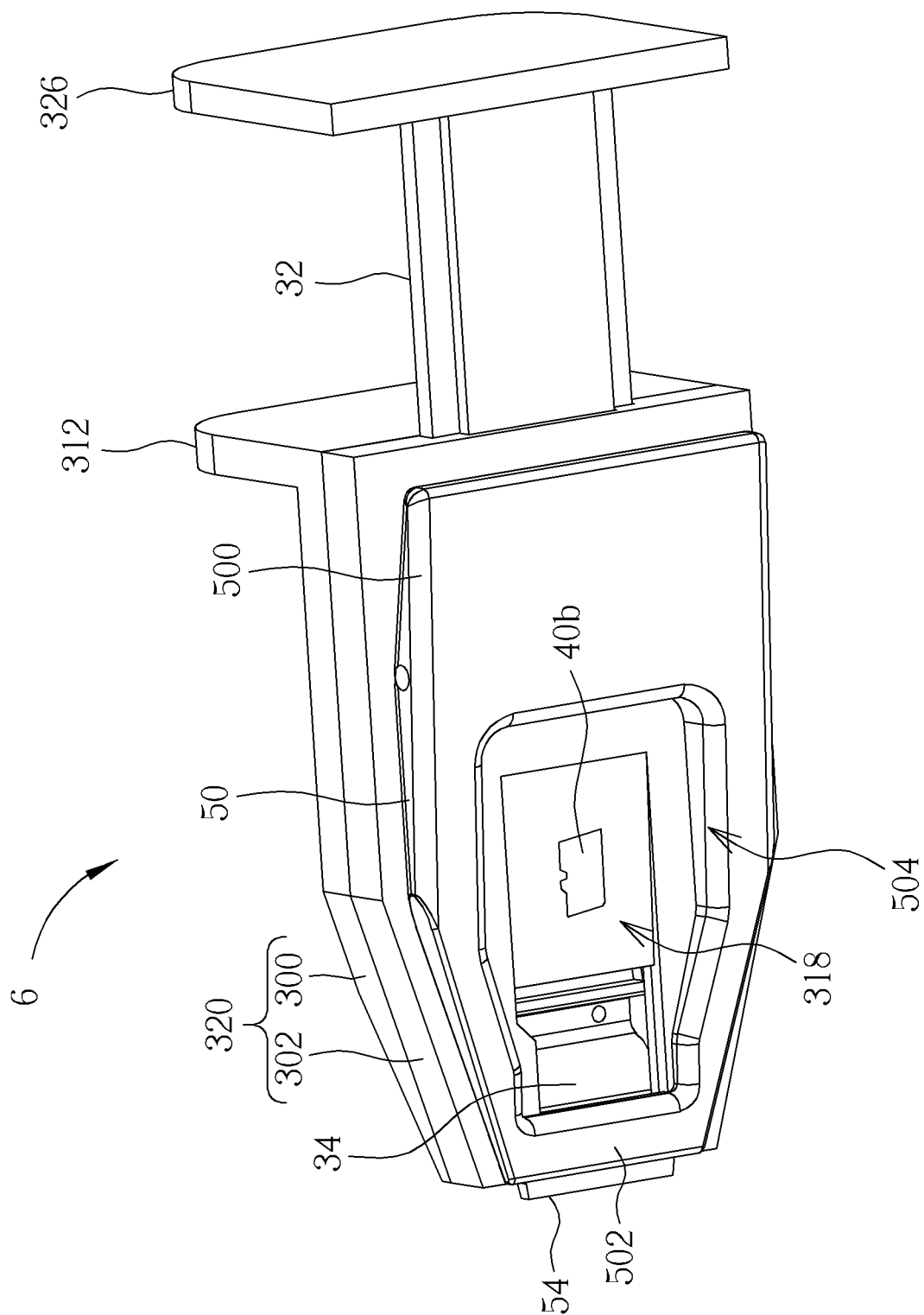
FIG. 13 is a perspective view illustrating the card installation device shown in FIG. 12 from another view angle.
Figure 14:
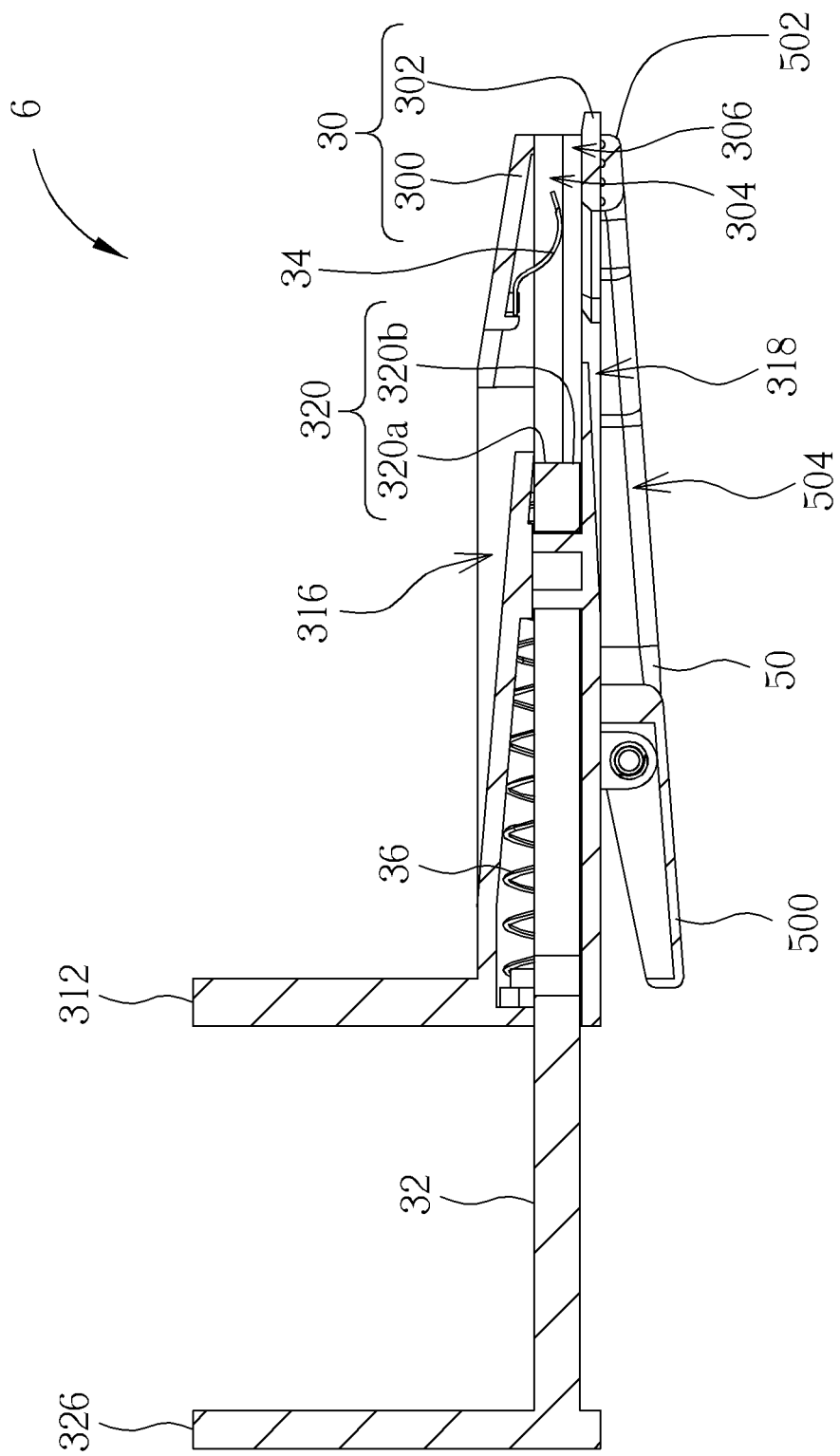
FIG. 14 is a cross-sectional view illustrating the card installation device along line X-X shown in FIG. 12.

Referring to FIGS. 12 to 14, FIG. 12 is a perspective view illustrating a card installation device 6 according to another embodiment of the invention, FIG. 13 is a perspective view illustrating the card installation device 6 shown in FIG. 12 from another view angle, and FIG. 14 is a cross-sectional view illustrating the card installation device 6 along line X-X shown in FIG. 12. The main difference between the card installation device 6 and the aforesaid card installation device 5 is that a first fool-proof opening 316 and a second fool-proof opening 318 are formed on opposite sides of the casing 30 of the card installation device 6. As shown in FIGS. 12 and 14, the first fool-proof opening 316 is formed on the upper casing 300 of the casing 30. A shape of the first fool-proof opening 316 is corresponding to a shape of the aforesaid first card 4a and the first fool-proof opening 316 communicates with the first accommodating recess 304 such that the first card 4a is allowed to pass through the first fool-proof opening 316 and then gets into the first accommodating recess 304. Furthermore, a first pattern 40a, which is corresponding to the shape of the first card 4a, may be formed in the first fool-proof opening 316 for purpose of identification.

As shown in FIG. 13, the second fool-proof opening 318 is formed on the lower casing 302 of the casing 30. A shape of the second fool-proof opening 318 is corresponding to a shape of the aforesaid second card 4b and the second fool-proof opening 318 communicates with the second accommodating recess 306. Since the clamping member 50 and the second fool-proof opening 318 are located at same side of the casing 30, a through hole 504 is formed on the clamping member 50 such that the second card 4b is allowed to pass through the through hole 504 and the second fool-proof opening 318 and then gets into the second accommodating recess 306. Furthermore, a second pattern 40b, which is corresponding to the shape of the second card 4b, may be formed in the second fool-proof opening 318 for purpose of identification.

Since the shape of the first fool-proof opening 316 is corresponding to the shape of the first card 4a and the shape of the second fool-proof opening 318 is corresponding to the shape of the second card 4b, the first card 4a is allowed to be inserted into the first fool-proof opening 316 in one single direction and the second card 4b is also allowed to be inserted into the second fool-proof opening 318 in one single direction, so as to prevent the first card 4a or the second card 4b from being installed in a wrong direction or in a wrong recess by the user.

Figure 15:
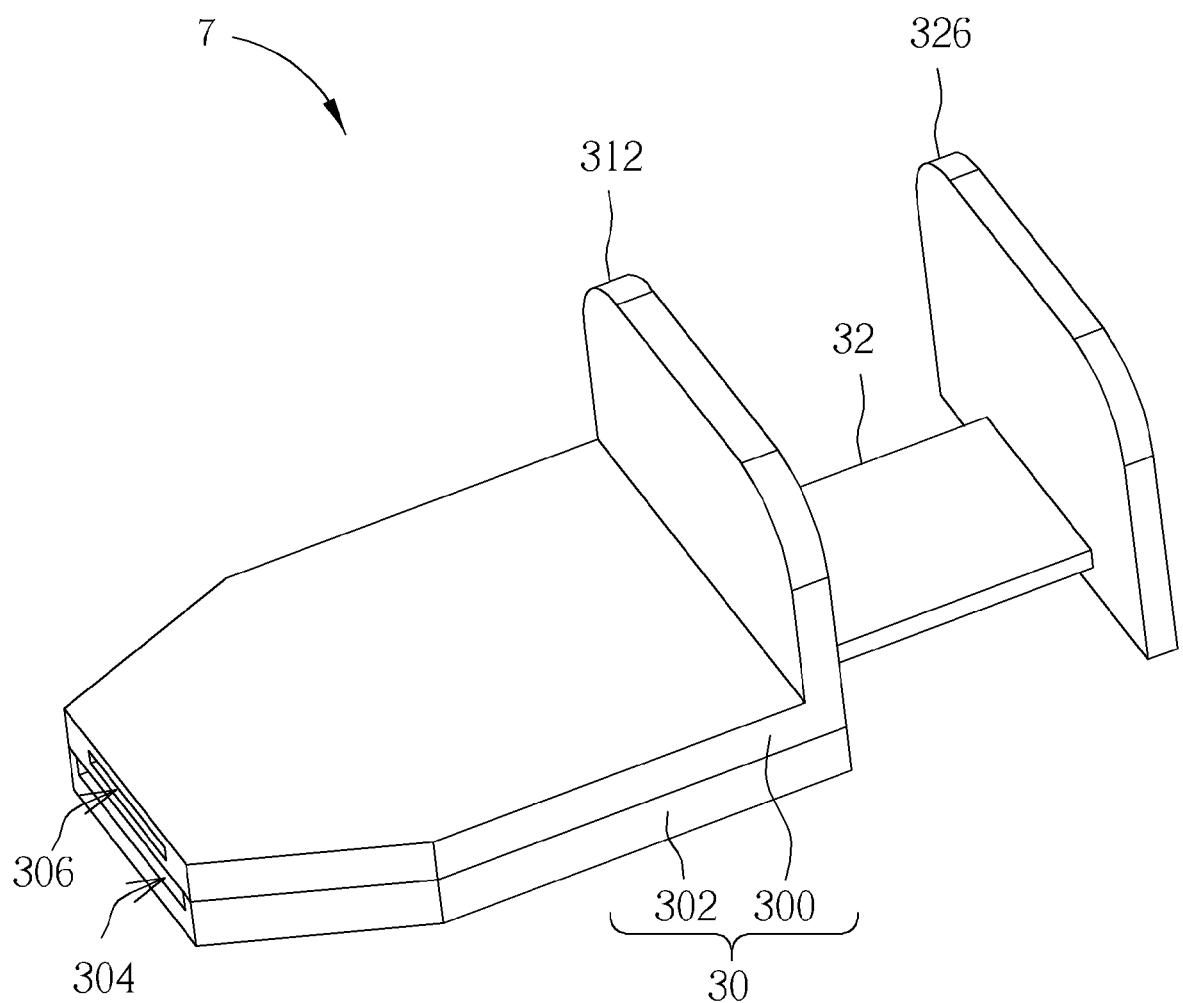
FIG. 15 is a perspective view illustrating a card installation device according to another embodiment of the invention.
Figure 16:
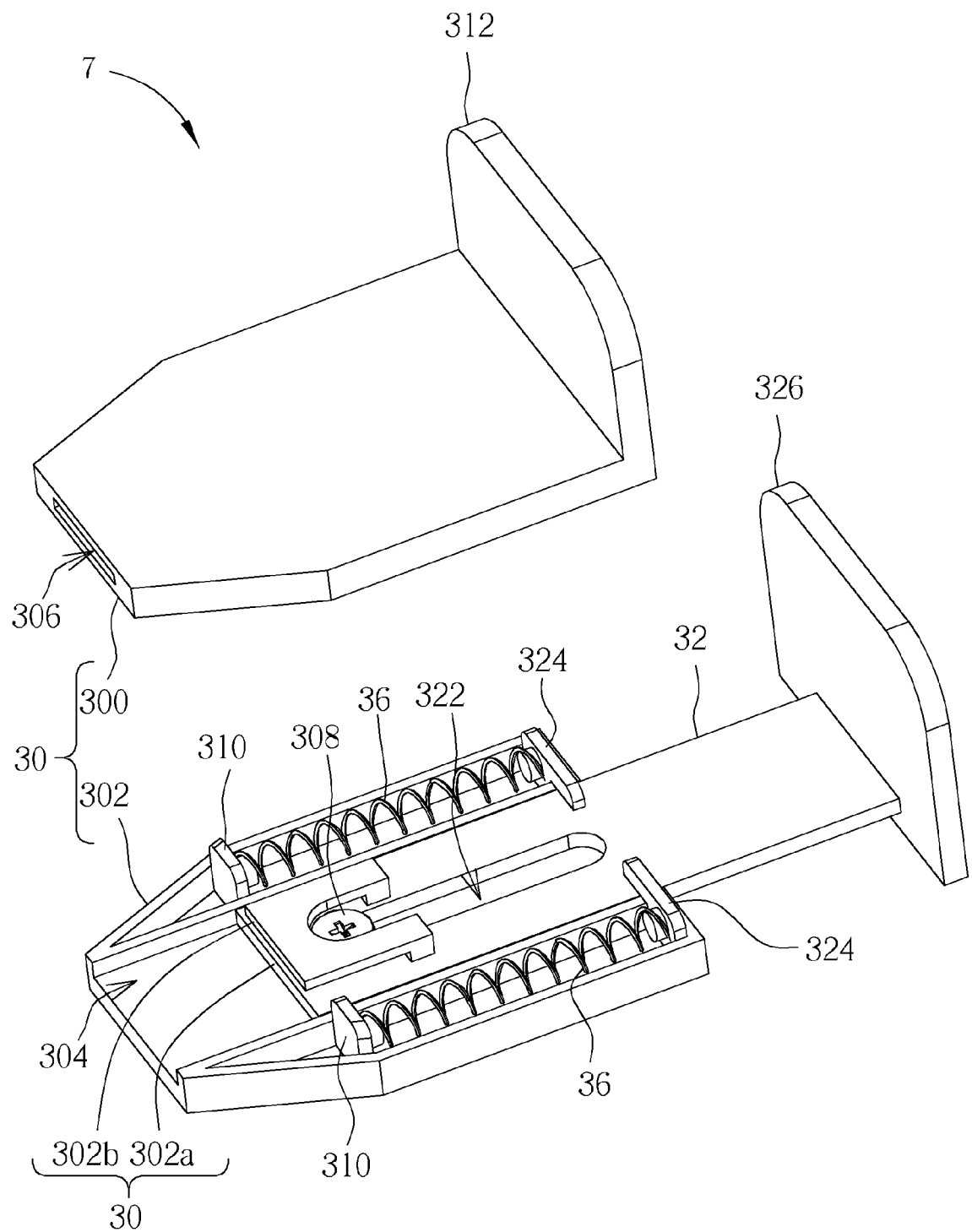
FIG. 16 is a partial exploded view illustrating the card installation device shown in FIG. 15.

Referring to FIGS. 15 and 16, FIG. 15 is a perspective view illustrating a card installation device 7 according to another embodiment of the invention, and FIG. 16 is a partial exploded view illustrating the card installation device 7 shown in FIG. 15. The main difference between the card installation device 7 and the aforesaid card installation device 3 is that the first accommodating recess 304 and the second accommodating recess 306 of the card installation device 7 are separated from each other into two independent layers and the pushing end 320 of the pushing member 32 is U-shaped so that the first pushing surface 320a and the second pushing surface 320b are also separated from each other into two independent layers. Since the openings of the first accommodating recess 304 and the second accommodating recess 306 both are formed as closed loop, the aforesaid resilient plate 34, which is used for clamping the first card 4a or the second card 4b, is unnecessary for the card installation device 7.

As mentioned in the above, a user can install a card in the accommodating recess of the casing of the card installation device, align the card with a card slot of an electronic device using the card installation device, and then press the pushing member to push the card into the card slot of the electronic device by the pushing end of the pushing member. Therefore, the invention can assist the user in aligning the card with the card slot well during insertion so as to prevent the card and/or the card slot from being damaged. Furthermore, the invention may form a plurality of accommodating recesses with different widths in the casing of the card installation device for accommodating various cards with different sizes such that the user can operates the card installation device of the invention to install various cards with different sizes into corresponding card slots of the electronic device. Moreover, the invention may form a fool-proof opening, which is corresponding to a shape of the card, on the casing of the card installation device, so as to prevent the card from being installed in a wrong direction or in a wrong recess by the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A card installation device comprising:
   a casing having a first accommodating recess for accommodating a first card;
   a pushing member, a pushing end of the pushing member being movably disposed in the casing; and
   a resilient plate fastened on the casing and located over the first accommodating recess
   wherein when the first card is accommodated in the first accommodating recess, the pushing end is used for pushing the first card and the resilient plate is used for clamping the first card.

2. The card installation device of claim 1, wherein a front end of the resilient plate is arc-shaped.

3. The card installation device of claim 1, wherein the casing has a protruding portion therein, the pushing member has a guiding groove, and the protruding portion is disposed in the guiding groove.

4. The card installation device of claim 3, wherein the casing has two side walls therein located at opposite sides of the protruding portion, the pushing member has two side wings located at opposite sides of the guiding groove and opposite to the two side walls, the card installation device further comprises two resilient members, and each of the two resilient members is disposed between one of the side walls and one of the side wings correspondingly.

5. The card installation device of claim 1, wherein the casing has a holding portion, the pushing member has a pressing portion, and the holding portion and the pressing portion are used together for a user to operate the card installation device.

6. The card installation device of claim 1, wherein the casing further has a second accommodating recess for accommodating a second card, the first accommodating recess and the second accommodating recess are arranged up and down, a width of the second accommodating recess is different from a width of the first accommodating recess, the pushing end has a first pushing surface and a second pushing surface, the first pushing surface is used for pushing the first card when the first card is accommodated in the first accommodating recess, and the second pushing surface is used for pushing the second card when the second card is accommodated in the second accommodating recess.

7. A card installation device comprising:
   a casing having a first accommodating recess for accommodating a first card, a protruding portion therein, and two side walls therein located at opposite sides of the protruding portion;
   a pushing member, a pushing end of the pushing member being movably disposed in the casing, the pushing member having a guiding groove and two side wings located at opposite sides of the guiding groove and opposite to the two side walls, the protruding portion being disposed in the guiding groove; and
   two resilient members, each of the two resilient members being disposed between one of the side walls and one of the side wings correspondingly;
   wherein when the first card is accommodated in the first accommodating recess, the pushing end is used for pushing the first card.

8. The card installation device of claim 7, further comprising a resilient plate fastened on the casing and located over the first accommodating recess, a front end of the resilient plate being arc-shaped, wherein when the first card is accommodated in the first accommodating recess, the resilient plate is used for clamping the first card.

9. The card installation device of claim 7, wherein the casing has a holding portion, the pushing member has a pressing portion, and the holding portion and the pressing portion are used together for a user to operate the card installation device.

10. The card installation device of claim 7, wherein the casing further has a second accommodating recess for accommodating a second card, the first accommodating recess and the second accommodating recess are arranged up and down, a width of the second accommodating recess is different from a width of the first accommodating recess, the pushing end has a first pushing surface and a second pushing surface, the first pushing surface is used for pushing the first card when the first card is accommodated in the first accommodating recess, and the second pushing surface is used for pushing the second card when the second card is accommodated in the second accommodating recess.

11. A card installation device comprising:
- a casing having a first accommodating recess for accommodating a first card and a second accommodating recess for accommodating a second card, the first accommodating recess and the second accommodating recess being arranged up and down, a width of the second accommodating recess being different from a width of the first accommodating recess; and
- a pushing member, a pushing end of the pushing member being movably disposed in the casing, the pushing end having a first pushing surface and a second pushing surface;
- wherein the first pushing surface is used for pushing the first card when the first card is accommodated in the first accommodating recess, and the second pushing surface is used for pushing the second card when the second card is accommodated in the second accommodating recess.

12. The card installation device of claim 11, further comprising a resilient plate fastened on the casing and located over the first accommodating recess, a front end of the resilient plate being arc-shaped, wherein when the first card is accommodated in the first accommodating recess, the resilient plate is used for clamping the first card.

13. The card installation device of claim 11, wherein the casing has a protruding portion therein, the pushing member has a guiding groove, and the protruding portion is disposed in the guiding groove.

14. The card installation device of claim 11, wherein the casing has a holding portion, the pushing member has a pressing portion, and the holding portion and the pressing portion are used together for a user to operate the card installation device.

* * * * *